United States Patent
Shimoda et al.

(10) Patent No.: US 10,482,406 B2
(45) Date of Patent: Nov. 19, 2019

(54) ENERGY-SAVING-OPERATION RECOMMENDING SYSTEM

(71) Applicant: TOSHIBA MITSUBISHI-ELECTRIC INDUSTRIAL SYSTEMS CORPORATION, Chuo-ku (JP)

(72) Inventors: Naoki Shimoda, Tokyo (JP); Kazuhiro Ohara, Tokyo (JP); Hiroyuki Imanari, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 582 days.

(21) Appl. No.: 14/909,379

(22) PCT Filed: Aug. 2, 2013

(86) PCT No.: PCT/JP2013/071030
§ 371 (c)(1),
(2) Date: Feb. 1, 2016

(87) PCT Pub. No.: WO2015/015643
PCT Pub. Date: Feb. 5, 2015

(65) Prior Publication Data
US 2016/0180269 A1    Jun. 23, 2016

(51) Int. Cl.
*G06Q 10/06* (2012.01)
*B21B 37/00* (2006.01)
*G06Q 50/06* (2012.01)

(52) U.S. Cl.
CPC ....... *G06Q 10/06312* (2013.01); *B21B 37/00* (2013.01); *G06Q 50/06* (2013.01); *Y02P 90/82* (2015.11)

(58) Field of Classification Search
None
See application file for complete search history.

(56) References Cited

U.S. PATENT DOCUMENTS

| 4,106,318 A * | 8/1978 | Yanagimoto | B21B 1/026 |
| | | | 700/155 |
| 4,152,140 A * | 5/1979 | Hori | C21C 7/10 |
| | | | 266/208 |

(Continued)

FOREIGN PATENT DOCUMENTS

| CN | 104126262 A | 10/2014 | |
| EP | 0791411 A2 * | 8/1997 | B21B 37/28 |

(Continued)

OTHER PUBLICATIONS

Kant, Girish, and Kuldip Singh Sangwan. "Prediction and optimization of machining parameters for minimizing power consumption and surface roughness in machining." Journal of cleaner production 83 (2014): 151-164. (Year: 2014).*

(Continued)

*Primary Examiner* — Thomas L Mansfield
*Assistant Examiner* — Derick J Holzmacher
(74) *Attorney, Agent, or Firm* — Oblon, McClelland, Maier & Neustadt, L.L.P.

(57) ABSTRACT

In an energy-saving-operation recommending system, a total energy consumption of plural facilities during passage of one material to be rolled through a rolling line is calculated, and the total energy consumption is divided by a width and a length of the material to be rolled before rolling to calculate an energy consumption reference value that defines energy consumption per unit width and unit length of the material to be rolled. The energy consumption reference value is stored in association with a steel grade and a target post-rolling plate thickness of the material to be rolled. An energy consumption reference value corresponding to a steel grade and a target post-rolling plate thickness of a material to be next rolled on the rolling line is obtained. The energy consumption reference value is multiplied by a width and a (Continued)

| | JUDGEMENT CRITERIA OF PRODUCT QUALITY AND MATERIAL QUALITY | CHANGING POLICY OF AN OPERATION CONDITION HAVING AN ENERGY-SAVING EFFECT |
|---|---|---|
| 1 | A STANDARD DEVIATION OF THE FINISHING MILL OUTLET SIDE FLATNESS PERFORMANCE IS A CERTAIN THRESHOLD OR LARGER | REDUCE THE ROLLING LOAD DISTRIBUTION RATIO OF THE REAR STAND IN THE FINISHING MILL |
| 2 | AN ALLOWANCE DOWN TO THE LOWER LIMIT VALUE OF THE MECHANICAL PROPERTY IS A CERTAIN THRESHOLD OR LARGER | INCREASE THE FINISHING MILL OUTLET SIDE TARGET TEMPERATURE (FDT) |
| 3 | AN ALLOWANCE DOWN TO THE LOWER LIMIT VALUE OF THE MECHANICAL PROPERTY IS A CERTAIN THRESHOLD OR LARGER | REDUCE A TARGET PLATE THICKNESS OF THE TRANSFER BAR |
| 4 | AN ALLOWANCE UP TO THE UPPER LIMIT OF THE PRODUCT QUALITY FOR A CROWN ON AN OUTLET SIDE OF THE FINISHING MILL IS A CERTAIN THRESHOLD OR LARGER | INCREASE THE ROLLING LOAD DISTRIBUTION RATIO OF THE FRONT STAND IN THE FINISHING MILL |
| .. | .... | .... |
| | | | length of the material to be next rolled to calculate predicted energy consumption.

5 Claims, 4 Drawing Sheets

(56) References Cited

U.S. PATENT DOCUMENTS

| | | | | |
|---|---|---|---|---|
| 4,528,834 A * | 7/1985 | Aoyagi | B21B 1/18 | 72/202 |
| 4,660,617 A * | 4/1987 | Tsutsumi | B22D 11/168 | 164/451 |
| 5,493,885 A * | 2/1996 | Nomura | B21B 37/16 | 72/11.7 |
| 5,509,285 A * | 4/1996 | Anbe | B21B 37/28 | 72/201 |
| 5,531,089 A * | 7/1996 | Nikaido | B21B 13/023 | 228/158 |
| 5,564,178 A * | 10/1996 | Takashima | B21B 1/466 | 29/33 C |
| 5,634,257 A * | 6/1997 | Kajiwara | B21B 1/26 | 29/527.7 |
| 5,860,304 A * | 1/1999 | Anbe | B21B 38/02 | 72/9.1 |
| 5,957,368 A * | 9/1999 | Takebayashi | B21B 15/0007 | 228/13 |
| 2004/0153196 A1* | 8/2004 | Park | G05B 23/0235 | 700/148 |
| 2006/0100727 A1* | 5/2006 | Dash | G05B 19/41865 | 700/97 |
| 2007/0151635 A1* | 7/2007 | Sano | B21B 37/44 | 148/508 |
| 2009/0083206 A1* | 3/2009 | Shigemori | G05B 19/418 | 706/46 |
| 2010/0024505 A1* | 2/2010 | Ueoka | B21B 45/0233 | 72/202 |
| 2010/0095722 A1* | 4/2010 | Nishiura | B21B 1/26 | 72/12.2 |
| 2010/0163205 A1* | 7/2010 | Seidel | B21B 1/463 | 164/452 |
| 2012/0004757 A1* | 1/2012 | Imanari | B21B 37/74 | 700/104 |
| 2013/0160277 A1* | 6/2013 | Benedetti | B21B 1/466 | 29/527.7 |
| 2013/0246107 A1* | 9/2013 | Tang | G06Q 10/0631 | 705/7.12 |
| 2015/0051745 A1* | 2/2015 | Imanari | H02J 3/32 | 700/291 |
| 2015/0114587 A1* | 4/2015 | Branagan | C22C 38/002 | 164/464 |
| 2015/0352612 A1* | 12/2015 | Jinnai | B21B 37/00 | 700/150 |

FOREIGN PATENT DOCUMENTS

| | | | | |
|---|---|---|---|---|
| EP | 1228818 B2 * | 9/2015 | | B21B 37/40 |
| JP | 63-23846 B2 | 5/1988 | | |
| JP | 2011-162804 A | 8/2011 | | |
| JP | 2012-170962 A | 9/2012 | | |
| JP | 2013-66929 A | 4/2013 | | |
| WO | WO-2008105479 A1 * | 9/2008 | | B21B 1/26 |
| WO | WO-2012101492 A1 * | 8/2012 | | B21B 1/463 |
| WO | WO 2013/121514 A1 | 8/2013 | | |
| WO | WO-2015066022 A1 * | 5/2015 | | C22C 38/58 |

OTHER PUBLICATIONS

Li, W., and S. Kara. "An empirical model for predicting energy consumption of manufacturing processes: a case of turning process." Proceedings of the Institution of Mechanical Engineers, Part B: Journal of Engineering Manufacture 225.9 (2011): 1636-1646. (Year: 2011).*

Campatelli, Gianni, Lorenzo Lorenzini, and Antonio Scippa. "Optimization of process parameters using a response surface method for minimizing power consumption in the milling of carbon steel." Journal of cleaner production 66 (2014): 309-316. (Year: 2014).*

Yi, Qian, et al. "Multi-objective parameter optimization of CNC machining for low carbon manufacturing." Journal of Cleaner Production 95 (2015): 256-264. (Year: 2015).*

Velchev, Stefan, et al. "Empirical models for specific energy consumption and optimization of cutting parameters for minimizing energy consumption during turning." Journal of cleaner production 80 (2014): 139-149. (Year: 2014).*

Ohara, Kazuhiro, et al. "Process optimization for the manufacturing of sheets with estimated balance between product quality and energy consumption." CIRP Annals 63.1 (2014): 257-260. (Year: 2014).*

Chen, Wei-Hsin, Y. C. Chung, and J. L. Liu. "Analysis on energy consumption and performance of reheating furnaces in a hot strip mill." International Communications in Heat and Mass Transfer 32.5 (2005): 695-706. (Year: 2005).*

Dietmair, Anton, and Alexander Verl. "Energy consumption modeling and optimization for production machines." 2008 IEEE International Conference on Sustainable Energy Technologies. IEEE, 2008. (Year: 2008).*

Li, Congbo, et al. "Selection of optimum parameters in multi-pass face milling for maximum energy efficiency and minimum production cost." Journal of Cleaner Production 140 (2017): 1805-1818. (Year: 2017).*

Guo, Yansong, et al. "Optimization of energy consumption and surface quality in finish turning." Procedia CIRP 1 (2012): 512-517. (Year: 2012).*

Combined Office Action and Search Report dated Sep. 20, 2016 in Chinese Application No. 201380078672.8 (with partial English translation and English translation of Categories of Cited Documents).

International Search Report dated Sep. 10, 2013, in PCT/JP2013/071030 filed Aug. 2, 2013.

* cited by examiner

FIG. 4

| | JUDGEMENT CRITERIA OF PRODUCT QUALITY AND MATERIAL QUALITY | CHANGING POLICY OF AN OPERATION CONDITION HAVING AN ENERGY-SAVING EFFECT |
|---|---|---|
| 1 | A STANDARD DEVIATION OF THE FINISHING MILL OUTLET SIDE FLATNESS PERFORMANCE IS A CERTAIN THRESHOLD OR LARGER | REDUCE THE ROLLING LOAD DISTRIBUTION RATIO OF THE REAR STAND IN THE FINISHING MILL |
| 2 | AN ALLOWANCE DOWN TO THE LOWER LIMIT VALUE OF THE MECHANICAL PROPERTY IS A CERTAIN THRESHOLD OR LARGER | INCREASE THE FINISHING MILL OUTLET SIDE TARGET TEMPERATURE (FDT) |
| 3 | AN ALLOWANCE DOWN TO THE LOWER LIMIT VALUE OF THE MECHANICAL PROPERTY IS A CERTAIN THRESHOLD OR LARGER | REDUCE A TARGET PLATE THICKNESS OF THE TRANSFER BAR |
| 4 | AN ALLOWANCE UP TO THE UPPER LIMIT OF THE PRODUCT QUALITY FOR A CROWN ON AN OUTLET SIDE OF THE FINISHING MILL IS A CERTAIN THRESHOLD OR LARGER | INCREASE THE ROLLING LOAD DISTRIBUTION RATIO OF THE FRONT STAND IN THE FINISHING MILL |
| .. | .... | .... |
| | | |

ENERGY-SAVING-OPERATION RECOMMENDING SYSTEM

TECHNICAL FIELD

The present invention relates to an energy-saving-operation recommending system for a rolling line.

BACKGROUND ART

A typical facility configuration of a hot rolling line will be described. For a hot rolling line, a hot steel plate slab heated to a required temperature in a slab heating furnace is conveyed on the rolling line, sequentially rolled, and finally wound around a coiler to be a product coil.

From the slab to the product coil, various processing temperature processes such as heating, rolling, or cooling are performed on the rolling line. For the heating process, facilities such as a slab reheating furnace, a bar heater, and an edge heater are provided. For the rolling process, rolling machine facilities such as an edger mill, a roughing mill, and a finishing mill are provided. For the cooling process, water injection facilities such as a scale breaker, a descaler, and a laminar cooling facility are provided. Further, mechanical facilities such as a table roller, a coil box, a crop shear, and a down coiler associated with conveyance of a material to be rolled are provided.

These facilities mainly use electric power and fuel, and consume energy. The rolling machine, the down coiler, the table roller, the crop shear, or the like is driven by a motor, and the motor consumes power energy. Also, in the water injection facilities such as a scale breaker, a descaler, and a laminar cooling facility, a pump is used to supply high pressure water or a large amount of water, and a motor that drives the pump consumes power energy. As such, on the rolling line, various facilities consume energy, and required energy consumption changes depending on an operation condition of each facility.

CITATION LIST

Patent Literature

Patent Literature 1: Japanese Patent Laid-Open No. 2011-162804
Patent Literature 2: Japanese Patent Publication No. 63-23846

SUMMARY OF INVENTION

Technical Problem

Most of conventional energy saving is mainly intended for each facility or some functions. However, even if energy is saved for some facilities or functions, energy is not necessarily saved for the entire rolling line. For example, as one energy-saving method for a roughing mill, it is conceivable that a target plate thickness of a transfer bar between a roughing mill and a finishing mill is increased to reduce a rolling reduction of the roughing mill from a slab thickness to a transfer bar thickness. This can reduce rolling torque of the roughing mill, and reduce energy consumption of a motor that drives the roughing mill. However, this increases the transfer bar thickness. Thus, for the finishing mill downstream of the roughing mill, a rolling reduction from the transfer bar thickness to a target plate thickness of an end product increases. This increases rolling torque of the finishing mill, and increases energy consumption of a motor that drives the finishing mill. Although energy is saved for the roughing mill only, energy consumption of the entire rolling line including the finishing mill is determined by a total sum of an increase and a decrease of energy consumption of each facility, and thus energy is not necessarily saved.

Also, a rolling schedule changes with changes in steel grade and size of a material to be rolled, and this changes energy consumption of a rolling machine. Further, a water injection amount changes as a cooling condition of a laminar water injection facility changes for obtaining a required product material quality, or as a spray pattern of a descaler is changed for ensuring a material surface quality. This changes an operation situation of a pump and changes energy consumption of a driving motor. As such, energy consumption of each facility changes depending on a steel grade and size of the material to be rolled, a required product material quality, and a product quality, and energy consumption of the entire rolling line also changes. Since an energy-saving amount for the energy consumption of the entire rolling line is determined by the total sum of the increase and the decrease in energy consumption of each facility, it is important that even if the steel grade and size of the material to be rolled, the required product material quality, the product quality, or the like changes, energy consumption of each facility on the rolling line can be predicted with satisfactory accuracy.

Conventionally, for energy saving on the hot rolling line, it has been proposed that a most upstream heating furnace is operated to minimize combustion energy, or an operation condition of the rolling line is controlled to minimize a total cost.

For example, Japanese Patent Laid-Open No. 2011-162804 proposes a method of calculating a fuel flow with high prediction accuracy from a heat balance equation so as to maximize energy efficiency in a heating furnace that has a large heat capacity and requires a large amount of heating energy in a continuous heating furnace.

Also, Japanese Patent Publication No. 63-23846 proposes a control method for setting an extraction temperature, an extraction pitch, and a rolling speed to optimum values to minimize a total cost from a slab to a product in hot continuous rolling.

Energy saving for a heating furnace may be considered with a focus on how fuel to be used in the heating furnace is reduced to increase heating efficiency. However, it is not easy to consider energy saving for the entire rolling line. Various types of facilities that consume energy are provided on the rolling line, and energy efficiency of each facility varies a degree of energy saving. Thus, an increase and a decrease in energy consumption of the entire rolling line are complex.

Also, even if an operation condition of the rolling line can be changed to save energy, the change in operation condition may reduce a product quality such as a plate thickness, a plate width, a crown, or flatness to be lower than a required value, or reduce a mechanical property of a product material quality such as yield stress or tensile strength to be lower than a required value, thereby providing a defective. It is important to provide an operation condition of a rolling line capable of satisfying a required product quality and product material quality and also saving energy.

The present invention is achieved to solve the above described problems, and has an object to provide an energy-saving-operation recommending system capable of predicting with high accuracy energy consumption of the entire rolling line for a material to be next rolled, and improving an operation condition based on the prediction.

Solution to Problem

An embodiment of the present application is an energy-saving-operation recommending system in a rolling line for rolling a material to be rolled using a plurality of facilities, comprising:

an energy consumption performance calculation device for calculating total energy consumption of the plurality of facilities during passage of one material to be rolled through the rolling line, and dividing the total energy consumption by a width and a length of the material to be rolled before rolling to calculate an energy consumption reference value that defines energy consumption per unit width and unit length of the material to be rolled;

energy consumption reference value storage means for storing the energy consumption reference value calculated by the energy consumption performance calculation device in association with a steel grade and a target post-rolling plate thickness of the material to be rolled;

energy consumption reference value obtaining means for obtaining an energy consumption reference value corresponding to a steel grade and a target post-rolling plate thickness of a material to be next rolled on the rolling line, from the energy consumption reference value storage means; and energy consumption prediction calculation means for multiplying the energy consumption reference value obtained by the energy consumption reference value obtaining means by a width and a length of the material to be next rolled to calculate predicted energy consumption predicted to be consumed by the plurality of facilities during passage of the material to be next rolled through the rolling line.

Preferably, the energy-saving-operation recommending system, further comprising energy-saving-operation condition recommending means for recommending an operator an operation condition capable of reducing energy consumption to be smaller than the predicted energy consumption calculated by the energy consumption prediction calculation means while maintaining a product quality of a rolled material and a mechanical property of a product material quality within an allowable range.

Preferably, the energy-saving-operation recommending system, wherein the plurality of facilities include a finishing mill including a plurality of rolling stands, and a coiler provided downstream of the finishing mill, and the energy-saving-operation condition recommending means includes flatness detection means for detecting flatness of the material to be rolled from a downstream side of the finishing mill to an upstream side of the coiler, and first recommending means for recommending an operation condition of increasing a rolling load distribution ratio of a front stand and reducing a rolling load distribution ratio of a rear stand of the plurality of rolling stands when an indicator representing variations of flatness is an upper limit value or larger of the product quality.

Preferably, the energy-saving-operation recommending system, further comprising a material quality prediction calculation device for calculating a mechanical property value related to yield stress and tensile strength of the rolled material, wherein the plurality of facilities include a finishing mill including a plurality of rolling stands, and the energy-saving-operation condition recommending means includes second recommending means for recommending an operation condition of increasing a finishing mill outlet side target temperature when the mechanical property value is an allowable value or larger, which is set to be larger than a lower limit value of the mechanical property.

Preferably, the energy-saving-operation recommending system, further comprising a material quality prediction calculation device for calculating a mechanical property value related to yield stress and tensile strength of the rolled material wherein, the plurality of facilities include a roughing mill and a finishing mill provided downstream of the roughing mill, and the energy-saving-operation condition recommending means includes third recommending means for recommending an operation condition of reducing a target plate thickness of the material to be rolled between the roughing mill and the finishing mill when the mechanical property value is an allowable value or larger, which is set to be larger than a lower limit value of the mechanical property.

Preferably, the energy-saving-operation recommending system, wherein the plurality of facilities include a finishing mill including a plurality of rolling stands, and the energy-saving-operation condition recommending means includes crown value detection means for detecting a crown value of the material to be rolled on a downstream side of the finishing mill, and fourth recommending means for recommending an operation condition of increasing a rolling load distribution ratio of a front stand and reducing a rolling load distribution ratio of a rear stand of the plurality of rolling stands when the crown value is an allowable value or smaller, which is set to be smaller than an upper limit value of a product quality.

Advantageous Effects of Invention

According to the embodiment of the present invention, energy consumption of the entire rolling line for a material to be next rolled can be predicted with high accuracy. Also, according to the embodiment of the present invention, an operation condition capable of reducing energy consumption of the entire rolling line while ensuring a product quality and a product material quality can be recommended to an operator.

BRIEF DESCRIPTION OF DRAWINGS

FIG. 4 shows an example of a rule base of the energy-saving-operation condition in Embodiment 1 of the present invention.

DESCRIPTION OF EMBODIMENT

Figure 1:
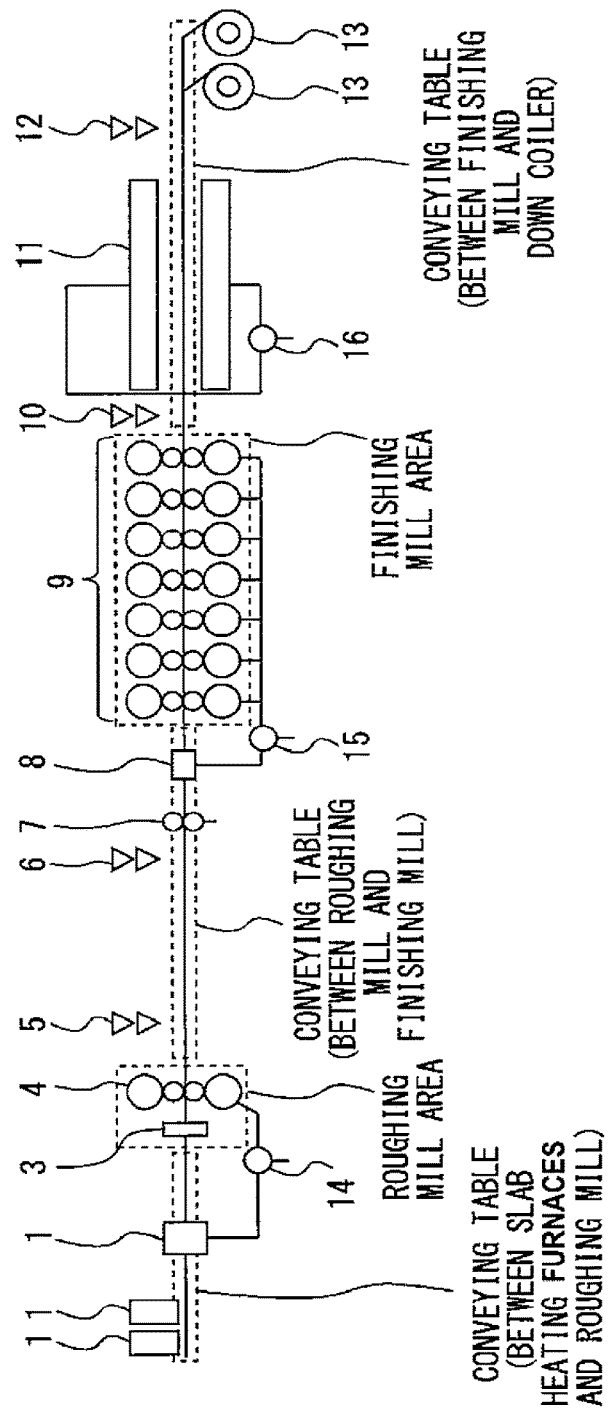
FIG. 1 is a schematic view of a facility of a rolling line to which an energy-saving-operation recommending system according to Embodiment 1 of the present invention is applied.

Now, with reference to the drawings, an embodiment of the present invention will be described in detail. Throughout the drawings, common elements are denoted by the same reference numerals, and redundant descriptions will be omitted.

"Product quality" herein refers to values that can be detected by various sensors provided on a rolling line, such as a plate thickness, a plate width, a crown, or flatness. "Product material quality" refers to values that cannot be detected by the various sensors provided on the rolling line, such as yield stress or tensile strength. The yield stress and the tensile strength can be measured by cutting a sample from a product coil for experiment.

Embodiment 1

[Rolling Line]

FIG. 1 is a schematic view of a facility of a rolling line to which an energy-saving-operation recommending system according to Embodiment 1 of the present invention is applied. FIG. 1 shows a hot rolling line in an iron and steel plant.

One or a plurality of slab heating furnaces 1 are provided upstream of the hot rolling line shown in FIG. 1. A slab is extracted from the slab heating furnace 1 onto the rolling line. The slab is a material to be rolled (hereinafter also simply referred to as "material"). The slab extracted from the slab heating furnace 1 is conveyed by a conveying table. The conveying table includes, for example, many rollers. Each roller is connected to a motor, and a rotational direction and a rotational speed of the motor are properly controlled to move the material to be rolled placed on the rollers at a predetermined speed in a predetermined direction.

A high pressure descaling device 2 is provided downstream of the slab heating furnace 1. An edger mill 3 is provided downstream of the high pressure descaling device 2. A roughing mill 4 is provided downstream of the edger mill 3. The slab extracted from the slab heating furnace 1 is roughly rolled by the roughing mill 4. The slab passes through the roughing mill 4 several times. The number of times of passage of the slab through the roughing mill 4 is referred to as the number of passes. The material to be rolled after rough rolling is referred to as a transfer bar.

A roughing mill outlet side sensor 5 for detecting a temperature of the material to be rolled is provided on an outlet side of the roughing mill 4. A finishing mill inlet side sensor 6 for detecting the temperature of the material to be rolled is provided downstream of the roughing mill outlet side sensor 5. A crop shear 7 is provided downstream of the finishing mill inlet side sensor 6. A finishing mill inlet side descaling device 8 is provided downstream of the crop shear 7. A finishing mill 9 is provided downstream of the finishing mill inlet side descaling device 8. The finishing mill 9 includes a plurality of rolling stands. The transfer bar is conveyed in the downstream direction while being finish-rolled by each rolling stand. The finish-rolled material wound around a down coiler 13 is referred to as a product.

A finishing mill outlet side sensor 10 for detecting the temperature, a plate thickness, a plate width, a crown, and flatness of the material to be rolled is provided downstream of the finishing mill 9. A runout laminar spray cooling device 11 is provided downstream of the finishing mill outlet side sensor 10.

A coiler inlet side sensor 12 for detecting the temperature of the material to be rolled is provided downstream of the runout laminar spray cooling device 11. One or a plurality of down coilers 13 are provided downstream of the coiler inlet side sensor 12. The material to be rolled is wound around the down coiler 13.

A roughing pump 14 for pumping up cooling water is connected to the high pressure descaling device 2 and the roughing mill 4. A finishing pump 15 for pumping up cooling water is connected to the finishing mill inlet side descaling device 8 and the finishing mill 9. A runout table pump 16 for pumping up cooling water is connected to the runout laminar spray cooling device 11. The material to be rolled is water-cooled by the cooling water pumped up by the roughing pump 14, the finishing pump 15, and the runout table pump 16 and adjusted in temperature.

The conveying table, the edger mill 3, the roughing mill 4, the crop shear 7, the finishing mill 9, the down coiler 13, the roughing pump 14, the finishing pump 15, and the runout table pump 16 described above each include a driving motor. The energy-saving-operation recommending system includes an energy consumption detection device that detects a performance value of energy consumption such as a current or a voltage consumed by each motor. Also, a position sensor (not shown) that detects a position of the material to be rolled is provided at each part on the rolling line. Based on the position of the material to be rolled and the performance value of energy consumption of each motor, energy consumption of each facility can be calculated for any material to be rolled.

An operation of each facility on the rolling line is properly controlled based on a calculation result of a process calculator (not shown). For example, depending on a set target transfer bar thickness, a rolling load and torque of the roughing mill 4 are determined to drive the motor. Depending on a set target product plate thickness, a rolling load and torque of each rolling stand in the finishing mill 9 are determined to drive the motor.

[Energy-saving-operation Recommending System]

Figure 2:
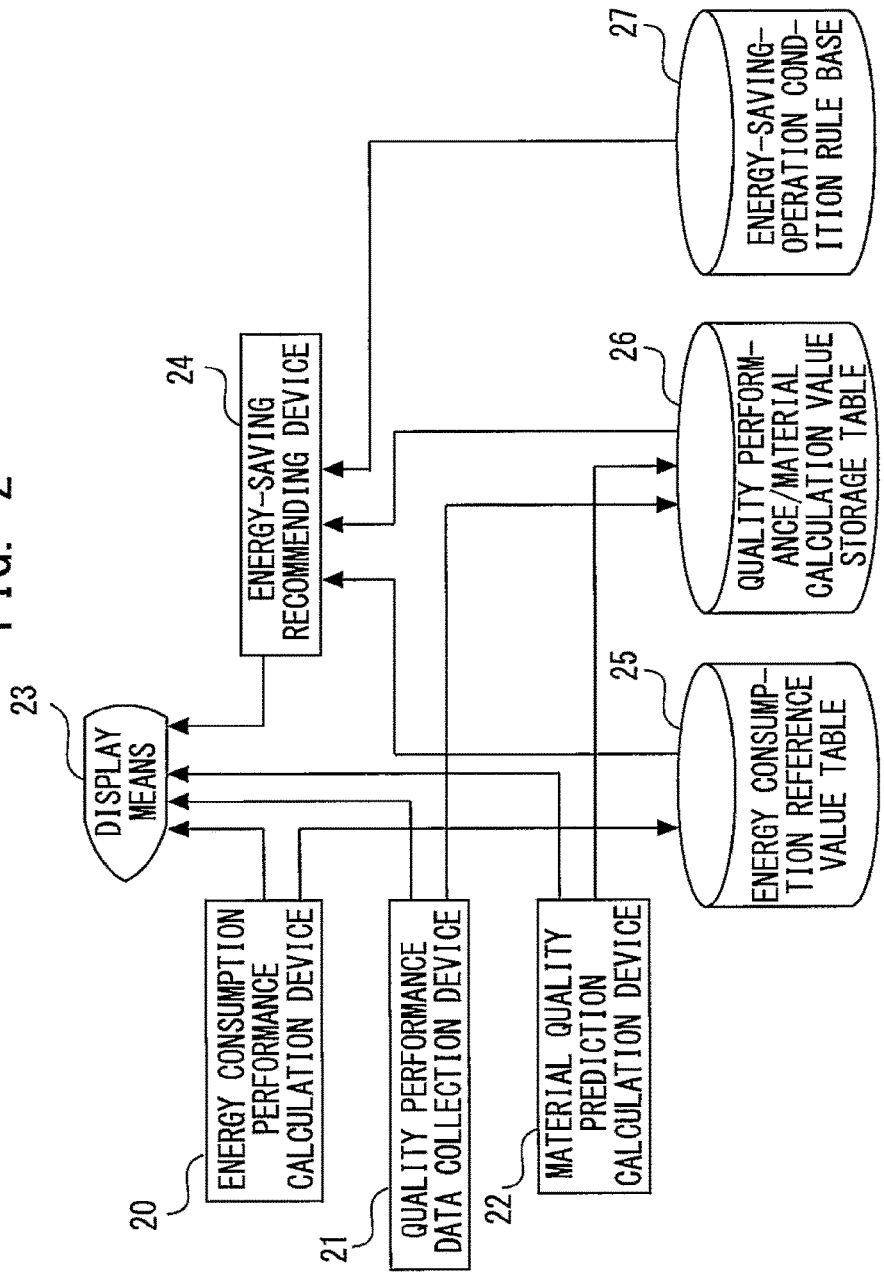
FIG. 2 is a conceptual configuration diagram of the energy-saving-operation recommending system according to Embodiment 1 of the present invention.

FIG. 2 is a conceptual configuration diagram of the energy-saving-operation recommending system according to Embodiment 1 of the present invention.

The energy-saving-operation recommending system is constituted by an arithmetic operation device including a memory device such as a ROM, a RAM, or a database, and operated by an implemented program. The energy-saving-operation recommending system includes an energy consumption performance calculation device 20, a quality performance data collection device 21, a material quality prediction calculation device 22, display means 23, an energy-saving recommending device 24, an energy consumption reference value table 25, a quality performance/material calculation value storage table 26, and an energy-saving-operation condition rule base 27. The energy consumption reference value table 25, the quality performance/material calculation value storage table 26, and the energy-saving-operation condition rule base 27 are controlled on one or a plurality of databases.

The energy consumption performance calculation device 20 connects to the display means 23 and the energy consumption reference value table 25. The quality performance data collection device 21 connects to the display means 23 and the quality performance/material calculation value storage table 26. The material quality prediction calculation device 22 connects to the display means 23 and the quality performance/material calculation value storage table 26. The energy-saving recommending device 24 connects to the display means 23, the energy consumption reference value table 25, the quality performance/material calculation value storage table 26, and the energy-saving-operation condition rule base 27.

(Energy Consumption Performance Calculation Device)

The energy consumption performance calculation device 20 will be described.

Performance of energy consumption can be calculated, for example, in the following manner using a current, a voltage, a rotational speed or the like obtained from a driving motor. This is an energy consumption calculation in rolling one material from a front end to a tail end.

$$E_i = \eta \int_{t=0}^{t=T} P_W(t)dt \qquad (1)$$

$$P_W(t) = \frac{1000 \cdot v(t) \cdot G(t)}{R} \qquad (2)$$

where Ei [MJ] is energy consumption performance for a time period T [s], t [s] is a time, v [m/s] is roll circumferential speed performance, G [kNm] is rolling torque (roll reference) performance, R[mm] is a roll radius, Pw is rolling power [kW], and η is power conversion efficiency (efficiency of conversion between current and work) [–].

Expression (1) above represents energy consumption for T [s] from a time t=0 to a time t=T. However, for example, for the rolling machine, a time when the front end of the material to be rolled engages the rolling machine to start rolling is t=0, then rolling proceeds, and a time when the tail end of the material to be rolled disengages from the rolling machine to finish the rolling is t=T. In this case, T [s] represents a rolling time period. As such, performance of energy Ei for one rolling pass is obtained. The material to be rolled is repeatedly rolled by the roughing mill 4 and the finishing mill 9, and thus a total sum of energy consumed in rolling of one material to be rolled is represented by Expression (3).

$$E_p = \sum_{Ri=1}^{N_R} E_{Ri} + \sum_{Fi=1}^{N_F} E_{Fi} \qquad (3)$$

where i is a pass index of the roughing mill 4 and the finishing mill 9, Ri is an i-th pass of the roughing mill 4, Fi is an i-th stand of the finishing mill 9, $N_R$ is a final rolling pass of the roughing mill 4, and $N_F$ is a final stand of the finishing mill 9.

Further, overall energy consumption before one material to be rolled extracted from the slab heating furnace 1 is finally wound around the down eviler 13 is represented by Expression (4).

$$E_p^{total} = \qquad (4)$$
$$\sum_{Ri=1}^{N_R} E_{Ri} + \sum_{Fi=1}^{N_F} E_{Fi} + \sum_{Ei=1}^{N_E} E_{Ei} + \sum_{Ti=1}^{N_T} E_{Ti} + E_{DC} + E_{RP} + E_{FP} + E_{ROTP}$$

where $E_{Ei}$ [MJ] is energy consumption performance in each rolling pass of the edger mill 3, $E_{Ti}$ [MJ] is energy consumption performance of each motor of the conveying table, $E_{DC}$ [MJ] is energy consumption performance of the down coiler 13, $E_{RP}$ [MJ] is energy consumption performance of a pump motor of a tank that supplies water to spray-related members (a high pressure water descaler, a roughing mill descaler) of the roughing pump 14, $E_{FP}$ [MJ] is energy consumption performance of a pump motor of a tank that supplies water to spray-related members (a finishing mill inlet side descaler, a spray between rolling stands of the finishing mill, or the like) of the finishing pump 15, and $E_{ROTP}$ [MJ] is energy consumption performance of a pump motor of a tank that supplies water to a laminar spray of a runout table.

As such, energy consumption required for the overall processing water cooling process of one material to be rolled is calculated based on performance data.

The energy consumption for one material to be rolled thus calculated differs depending on the steel grade or size of the material to be rolled. This is because a change in rolling torque or a change in temperature schedule for obtaining a required product material quality changes an amount of water to be used, or a change in length of the material to be rolled changes rolling and cooling times. The calculated energy consumption can be standardized to absorb an energy change for a certain degree of change element. For example, the rolling torque is substantially proportional to a plate width, and the length of the material to be rolled is substantially correlated to the rolling time.

Then, in the present invention, the energy consumption performance calculation device 20 calculates, as shown in Expression (5), the total energy consumption (Expression (4)) of the facilities during passage of one material to be rolled through the rolling line, and divides the total energy consumption by a slab width and a slab length before rolling to calculate an energy consumption reference value that defines energy consumption per unit width and unit length of the material to be rolled.

$$E^{Norm\_total} = \frac{E_p^{total}}{B_S \cdot L_S} \qquad (5)$$

where $E^{total}_p$ [MJ] is energy consumption of the entire rolling line for one material to be rolled, $B_s$ [mm] is a slab width, $L_s$ [mm] is a slab length, $E^{Norm\_total}$ [MJ/mm$^2$] is an energy consumption reference value of the entire rolling line per unit width and unit length of the material to be rolled. Strictly, it cannot be said that the overall energy consumption is precisely proportional to the slab width and the slab length, but the slab width and the slab length can be used as typical indicators.

The energy consumption reference value can arrange the steel grade and a target plate thickness of the end product as keys. The energy consumption reference value table 25 stores the energy consumption reference value in association with the steel grade of the material to be rolled and the target product plate thickness. Also, if performance values of energy consumption reference values of a plurality of materials to be rolled are obtained for a section defined by the steel grade and the target product plate thickness, an average value thereof can be calculated to increase accuracy as a typical value. Alternatively, sequential updates by Expression (6) may reflect a trend of an energy consumption reference value of a material to be rolled more recently processed.

$$E_{i,j\_NEW}^{Norm} = (1-\alpha) \cdot E_{i,j\_OLD}^{Norm} + \alpha \cdot E_{i,j\_CUR}^{Norm} \qquad (6)$$

where $E^{Norm}_{i,j\_OLD}$ [MJ/mm$^2$] is a table value before update of an energy consumption reference value at a steel grade index i and a target product plate thickness index j, $E^{Norm}_{i,j\_CUR}$ [MJ/mm$^2$] is a calculation value of an energy consumption reference value of one latest material to be rolled at the same steel grade index i and the same target product plate thickness index j, $E^{Norm}_{i,j\_NEW}$ [MJ/mm$^2$] is a table update value of the energy consumption reference value at the same steel grade index i and the same target product plate thickness index j, and α is an update gain.

Similarly, the energy consumption reference value of each area is also controlled by the energy consumption reference value table 25.

$$E^{Norm\_RM} = \frac{\sum_{Ri=1}^{N_R} E_{Ri} + \sum_{Ei=1}^{N_E} E_{Ei}}{B_S \cdot L_S} \quad (7)$$

$$E^{Norm\_FM} = \frac{\sum_{Fi=1}^{N_F} E_{Fi}}{B_S \cdot L_S} \quad (8)$$

$$E^{Norm\_DC} = \frac{E_{DC}}{B_S \cdot L_S} \quad (9)$$

$$E^{Norm\_TBL} = \frac{\sum_{Ti=1}^{N_T} E_{Ti}}{B_S \cdot L_S} \quad (10)$$

$$E^{Norm\_RP} = \frac{E_{RP}}{B_S \cdot L_S} \quad (11)$$

$$E^{Norm\_FP} = \frac{E_{FP}}{B_S \cdot L_S} \quad (12)$$

$$E^{Norm\_ROTP} = \frac{E_{ROTP}}{B_S \cdot L_S} \quad (13)$$

Expression (7) represents an energy consumption reference value of a roughing mill area, Expression (8) represents an energy consumption reference value of a finishing mill area, Expression (9) represents an energy consumption reference value of the down coiler 13, Expression (10) represents an energy consumption reference value of the conveying table, Expression (11) represents an energy consumption reference value of the roughing pump 14, Expression (12) represents an energy consumption reference value of the finishing pump 15, and Expression (13) represents an energy consumption reference value of the runout table pump 16. The roughing mill area is an area including the edger mill 3 and the roughing mill 4 shown in FIG. 1. The finishing mill area is an area including the finishing mill 9 having the plurality of rolling stands shown in FIG. 1. The conveying table is divided into a plurality of areas (for example, an area between the slab heating furnace 1 and the roughing mill 4, an area between the roughing mill 4 and the finishing mill 9, an area between the finishing mill 9 and the down coiler 13). For simplicity of description, only one material to be rolled is present at the same time in one area herein. Thus, energy consumption of each area for one material to be rolled can be easily detected.

The energy consumption reference value of each area is controlled by the energy consumption reference value table 25. Thus, a typical energy consumption reference value based on a performance value can be obtained for each area with the steel grade and the target product plate thickness as keys.

In the calculation of the energy consumption reference value described above, the slab width and the slab length are used, and the slab thickness is assumed to be constant. However, the slab thickness may be additionally used to increase calculation accuracy.

(Quality Performance Data Collection Device)

The quality performance data collection device 21 collects performance data (performance value) on the product quality such as the plate thickness, plate width, crown, flatness, or the like detected by the finishing mill outlet side sensor 10. The quality performance data collection device 21 creates performance measuring chart data on the plate thickness, plate width, crown, and flatness as product quality information from performance data on the latest material to be rolled. The performance measuring chart data is transmitted to the display means 23. The performance data is stored in the quality performance/material calculation value storage table 26.

(Material Quality Prediction Calculation Device)

The performance data (performance value) on the mechanical property such as yield stress or tensile strength needs to be separately measured by a tensile tester or the like using a sample of a product coil, and cannot be obtained for all materials to be rolled. The material quality prediction calculation device 22 captures performance data on the mechanical property such as yield stress or tensile strength as product material quality information, and calculates prediction data (prediction value) using a model similar to a known material quality prediction system for a material to be rolled without performance data. The performance data and the prediction data are stored in the quality performance/material calculation value storage table 26 as mechanical property data of the product material quality. Also, the mechanical property data is transmitted to the display means 23.

(Display Means)

Figure 3:
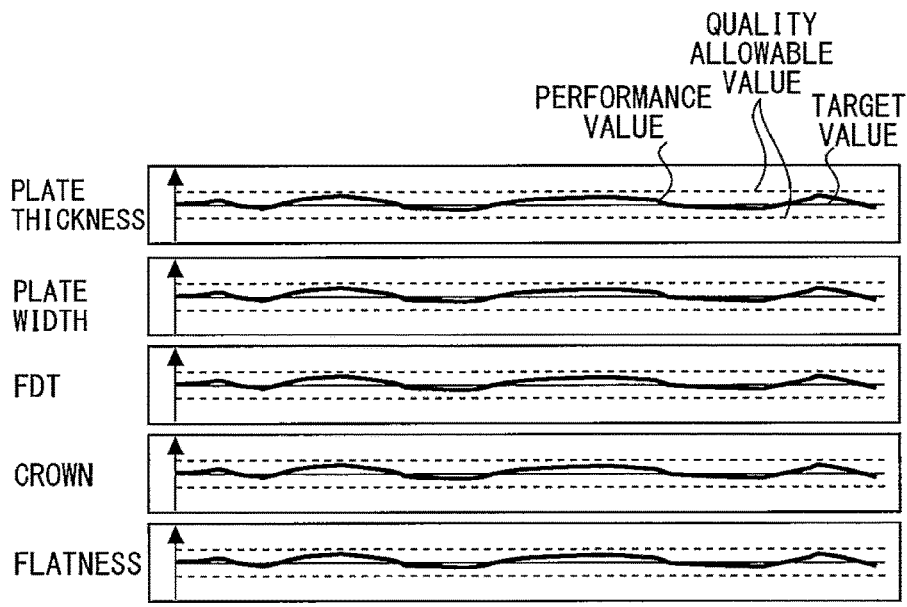
FIG. 3 is a schematic view of an example of a screen configuration of the display means in Embodiment 1 of the present invention.

FIG. 3 is a schematic view of an example of a screen configuration of the display means in Embodiment 1 of the present invention.

The display means 23 simultaneously displays the energy consumption reference value (values for the entire line and each area), the performance measuring chart data on the product quality, and the mechanical property data on the product material quality described above on one display portion.

An operator can compare and analyze energy consumption performance of each area from extraction of the material to be rolled from the slab heating furnace 1 to winding thereof around the down toiler 13, performance of the product quality such as the plate thickness, plate width, crown, or flatness, and information on the mechanical property of the product material quality in one screen displayed on the display means 23.

For example, the operator can check in which area a large amount of energy is consumed, or whether a problem does not arise on the product quality or the product material quality of the material to be rolled in a series of processes of the material to be rolled. Also, for the displayed product quality and product material quality, it can be considered whether or not energy consumption can be reduced (energy can be saved) in any area within an allowable range. Even if a certain operation condition can be changed to reduce energy consumption and save energy, a required quality or material quality being not satisfied provides a defective, leading to loss exceeding energy saving. Displaying the information on the energy consumption and the information on the product quality and the product material quality side by side in one screen facilitates comparison of the information, and allows consideration of the possibility of energy saving while ensuring the required product quality and product material quality.

(Energy-saving Recommending Device)

The energy-saving recommending device 24 reads an energy consumption reference value corresponding to a steel grade and a target product plate thickness of a material to be next rolled (slab) from the energy consumption reference value table 25. The read energy consumption reference value is multiplied by a slab width and a slab length of the material to be rolled to calculate energy consumption (predicted energy consumption) predicted to be consumed by each facility during passage of the material to be rolled through the rolling line.

The predicted energy consumption is calculated for the entire line $E^{total}p$ [MJ], the roughing mill area $E^{RM}p$ [MJ], the finishing mill area $E^{FM}p$ [MJ], the down coiler $E^{DC}p$ [MJ], the conveying table $E^{TBL}p$ [MJ], the roughing pump $E^{RP}p$ [MJ], the finishing pump $E^{FP}p$ [MJ], and the runout table pump $E^{ROTP}p$ [MJ]. The display means 23 displays, together with the predicted energy consumption, the performance measuring chart on the product quality (plate thickness, plate width, crown, flatness) of the last material previously rolled with the same steel grade, product plate thickness, and product plate width, and the mechanical property data calculated by the material quality prediction calculation device 22.

Next, the energy-saving recommending device 24 recommends the possibility of energy saving in view of allowable ranges of the product quality and the product material quality.

First, menus of typical operation conditions relating to energy saving are listed below:
(1) a heating furnace extraction temperature;
(2) a transfer bar thickness between roughing mill and finishing mill;
(3) a finishing mill outlet side target temperature (FDT); and
(4) a rolling load distribution ratio of each rolling stand in the finishing mill.

A change in the heating furnace extraction temperature in (1) will be described. Increasing an extraction temperature of the slab causes the roughing mill 4 and the finishing mill 9 to roll at a higher temperature, thereby reducing deformation resistance and reducing the rolling load and the torque. This reduces energy consumption of the roughing mill 4 and the finishing mill 9, providing an energy-saving effect.

A change in the transfer bar thickness in (2) will be described. Reducing the transfer bar thickness increases a total rolling reduction from the slab thickness to the final transfer bar thickness in the roughing mill 4, thereby increasing energy consumption of the entire roughing mill 4. On the other hand, in the finishing mill 9, a total rolling reduction from the transfer bar thickness to the target product plate thickness decreases, thereby typically reducing energy consumption of the entire finishing mill 9. Thus, a balance between an amount of increase in energy in the roughing mill 4 and an amount of decrease in energy in the finishing mill 9 determines an increase and a decrease in energy consumption of the entire rolling line. Typically, energy consumption of the entire finishing mill 9 is larger than that of the entire roughing mill 4. Thus, an increase and a decrease in energy consumption of the finishing mill 9 have a larger influence on energy saving. Thus, reducing the transfer bar thickness typically reduces energy consumption of the entire rolling line, providing an energy-saving effect.

A change in the finishing mill outlet side target temperature (FDT) in (3) will be described. Increasing the FDT causes each rolling stand in the finishing mill 9 to roll at a higher temperature, thereby reducing deformation resistance and reducing the rolling load and the torque. On the other hand, a rolling speed of the finishing mill 9 increases in order to achieve a higher FDT. However, the reduction in rolling torque has a larger influence than the increase in rolling speed. Thus, increasing the FDT typically reduces energy consumption of the entire finishing mill 9 and also reduces energy consumption of the entire rolling line, providing an energy-saving effect.

For the rolling load distribution ratio of each rolling stand in the finishing mill 9 in (4), increasing a ratio of an upstream front stand and reducing a ratio of a downstream rear stand typically reduce energy consumption of the entire finishing mill 9, providing an energy-saving effect. This is because the rolling load and the torque increase in the front stand and the rolling load and the torque decrease in the rear stand, but an amount of increase in torque is small in the front stand for rolling at a higher temperature, and an amount of decrease in torque is large in the rear stand for rolling at a lower temperature, and thus an amount of decrease in energy consumption is larger in total.

From the above, a relationship between the change in each operation condition and the energy-saving effect can be summarized as below:
(1) Increasing the heating furnace extraction temperature provides an energy-saving effect;
(2) Reducing the transfer bar thickness between the roughing mill and the finishing mill provides an energy-saving effect;
(3) Increasing the finishing mill outlet side target temperature (FDT) provides an energy-saving effect; and
(4) Increasing the rolling load distribution ratio of each stand in the finishing mill in the front stand and reducing the ratio in the rear stand provide an energy-saving effect.

Combining the operation conditions described above allows the operation conditions having the energy-saving effect to be changed. However, actually, due to restrictions of the product quality or the product material quality, all the operation conditions cannot be changed. Actually, a change in the operation condition needs to be selected that can be achieved within the allowable ranges of the changes in the product quality and the product material quality.

The energy-saving recommending device 24 recommends the operator an operation condition capable of reducing the energy consumption to be lower than the predicted energy consumption while maintaining the product quality of the material to be rolled and the mechanical property of the product material quality within the allowable ranges.

For example, operation condition changing policies having an energy-saving effect in view of the allowable ranges of the product quality and the product material quality include examples below:
(Rule 1) In case of a negative influence on the finishing mill outlet side flatness, reducing the rolling load distribution ratio of the rear stand in the finishing mill 9 improves flatness and provides an energy-saving effect.
(Rule 2) If the finishing mill outlet side target temperature (FDT) is allowed to be increased before a lower limit of the required mechanical property, increasing the FDT provides an energy-saving effect within the allowable range of the product material quality.
(Rule 3) If the total rolling reduction in the finishing mill 9 is allowed to be reduced before the lower limit of the required mechanical property, reducing the transfer bar thickness provides an energy-saving effect within the allowable range of the product material quality.
(Rule 4) If a finishing mill outlet side crown is allowed to be increased, increasing the rolling load distribution ratio of the front stand in the finishing mill 9 provides an energy-saving effect within an allowable range of the crown.

FIG. 4 shows an example of a rule base of the energy-saving-operation condition in Embodiment 1 of the present invention.

The energy-saving-operation condition rule base 27 stores a typical association between the product quality and the product material quality and the changing policy of the operation condition having an energy-saving effect as rules. The energy-saving recommending device 24 can obtain data on the product quality and the product material quality, select a condition matching the rule on the energy-saving-operation condition rule base 27, and display the changing policy of the operation condition having an energy-saving effect on the display means 23 for recommendation.

Rule 1 will be described. First, the energy-saving recommending device 24 calculates a standard deviation as an indicator that represents variations of flatness of the material to be rolled from performance data obtained by sampling the finishing mill outlet side flatness. In this case, typically, for the performance data on the finishing mill outlet side flatness, after the front end of the material to be rolled is wound around the down coiler 13, tension is generated between the finishing mill 9 and the down coiler 13 to reduce an output signal of the flatness. Thus, in calculation of the standard deviation, the standard deviation needs to be calculated from performance data sampled in the period until the front end of the material to be rolled is wound around the down coiler 13. If the standard deviation of the flatness is a certain threshold (an upper limit value of the product quality) or larger, the material to be rolled has poor flatness. In this case, the energy-saving recommending device 24 recommends an operation condition of increasing the rolling load distribution ratio of the front stand and reducing the rolling load distribution ratio of the rear stand for each rolling stand in the finishing mill 9. The operation condition is displayed on the display means 23.

Rules 2 and 3 will be described. A lower limit value of the mechanical property is given as a product request value. The energy-saving recommending device 24 compares a mechanical property value calculated by a material quality prediction system with the lower limit value of the mechanical property. When an allowance down to the lower limit value of the mechanical property (mechanical property value—lower limit value of mechanical property) is a certain threshold or larger, it is judged that the product material quality has an allowance to recommend to change the operation condition having the energy-saving effect described above.

Rule 2 is used under the condition that the finishing mill outlet side target temperature (FDT) is allowed to be increased. Typically, when the material to be rolled is cooled in the same cooling pattern in runout laminar spray cooling on a downstream side, increasing the finishing mill outlet side target temperature (FDT) tends to reduce strength of the mechanical property related to yield stress and tensile strength of the end product coil. First, the material quality prediction calculation device 22 calculates a mechanical property value related to yield stress and tensile strength based on the finishing mill outlet side target temperature (FDT) currently given. The energy-saving recommending device 24 recommends an operation condition of increasing the finishing mill outlet side target temperature (FDT) when the mechanical property value is an allowable value or larger, which is set to be larger than the lower limit value of the required mechanical property. The operation condition is displayed on the display means 23. The change in the operation condition can provide an energy-saving effect while ensuring minimum strength.

Rule 3 is used under the condition that the total rolling reduction in the finishing mill 9 is allowed to be reduced. First, the material quality prediction calculation device 22 calculates a mechanical property value related to yield stress and tensile strength based on the finishing mill outlet side target temperature (FDT) currently given. The energy-saving recommending device 24 recommends an operation condition of reducing a target plate thickness of the material to be rolled (transfer bar) between the roughing mill 4 and the finishing mill 9 when the mechanical property value is an allowable value or larger, which is set to be larger than the lower limit value of the required mechanical property. The operation condition is displayed on the display means 23. The change in the operation condition can provide an energy-saving effect while ensuring minimum strength.

Rule 4 will be described. An upper limit value of a product quality for a crown on an outlet side of the finishing mill 9 is given as a product request value. The energy-saving recommending device 24 recommends an operation condition of increasing the rolling load distribution ratio of the front stand and reducing the rolling load distribution ratio of the rear stand for each rolling stand in the rolling mill when a performance value of the crown measured by the finishing mill outlet side sensor 10 is an allowable value or smaller, which is set to be smaller than the upper limit value of the product quality (in other words, when an allowance up to the upper limit value of the product quality (upper limit value—performance value) exceeds a certain threshold). The operation condition is displayed on the display means 23.

As described above, the energy-saving-operation recommending system according to the present invention calculates energy consumption of each facility based on performance data on the rolling line for each material to be rolled. The values of the energy consumption are summed to calculate energy consumption of the entire rolling line. Thus, only with a steel grade and a slab size of a material to be next rolled and a target product plate thickness, energy consumption of the entire rolling line can be predicted with high accuracy without any model.

Also, the energy-saving-operation recommending system can recommend the operator an operation condition capable of reducing the energy consumption of the entire rolling line while ensuring the product quality and the product material quality. Thus, the operator can change the operation condition at ease. Also, according to the energy-saving-operation recommending system, the association between the product quality and the product material quality and the energy-saving effect is clearly displayed on the display means 23, and the operator can consider an energy-saving-operation in view of the association.

According to the energy-saving-operation recommending system, the performance data on the energy consumption and the performance data on the product quality can be unified to consider the improvement or allowance of the product quality, and then suggest an operation condition having an energy-saving effect. Thus, the operator can change the operation condition at ease.

According to the energy-saving-operation recommending system, the performance data on the energy consumption, the performance data on the product quality, and the calculation value of the mechanical property of the product material quality can be unified to consider the improvement or allowance of the product quality and the product material quality, and then suggest an operation condition having an energy-saving effect. Thus, the operator can change the operation condition at ease.

In Embodiment 1 described above, the energy consumption performance calculation device 20 corresponds to an "energy consumption performance calculation device" in the present invention, the energy consumption reference value table 25 corresponds to "energy consumption reference value storage means" in the present invention, the energy-saving recommending device 24 corresponds to "energy consumption reference value obtaining means", "energy consumption prediction calculation means", and "energy-saving-operation condition recommending means" in the present invention, the finishing mill outlet side sensor 10 corresponds to "flatness detection means" and "crown value detection means" in the present invention, and the material quality prediction calculation device 22 corresponds to a "material quality prediction calculation device" in the present invention.

REFERENCE SIGNS LIST 1 slab heating furnaces
2 high pressure descaling device
3 edger mill
4 roughing mill
5 roughing mill outlet side sensor
6 finishing mill inlet side sensor
7 crop shear
8 finishing mill inlet side descaling device
9 finishing mill
10 finishing mill outlet side sensor
11 runout laminar spray cooling device
12 coiler inlet side sensor
13 down coilers
14 roughing pump
15 finishing pump
16 runout table pump
20 energy consumption performance calculation device
21 quality performance data collection device
22 material quality prediction calculation device
23 display means
24 energy-saving recommending device
25 energy consumption reference value table
26 quality performance/material calculation value storage table
27 energy-saving-operation condition rule base

The invention claimed is:

1. An energy-saving-operation recommending system in a rolling line for rolling a material to be rolled using a plurality of facilities including a finishing mill having a plurality of rolling stands, comprising:
one or more processors configured to:
calculate total energy consumption of the plurality of facilities during passage of one material to be rolled through the rolling line,
divide the total energy consumption by a width and a length of the material to be rolled before rolling to calculate an energy consumption reference value that defines energy consumption per unit width and unit length of the material to be rolled, and
store the calculated energy consumption reference value in association with a steel grade and a target post-rolling plate thickness of the material to be rolled in an energy consumption reference value table; and
a sensor configured to measure a crown value of a material on a downstream side of the finishing mill and output a signal representing the crown value,
wherein the one or more processor is further configured to:
obtain an energy consumption reference value corresponding to a steel grade and a target post-rolling plate thickness of a material to be next rolled on the rolling line, from the energy consumption reference value table,
multiply the energy consumption reference value obtained from the energy consumption reference value table by a width and a length of the material to be next rolled to calculate predicted energy consumption predicted to be consumed by the plurality of facilities during passage of the material to be next rolled through the rolling line,
obtain the signal representing the crown value output from the sensor, and
recommend to an operator an operation condition reducing energy consumption consumed by the plurality of facilities to be smaller than the predicted energy consumption while maintaining a product quality of a rolled material and a mechanical property of a product material quality within an allowable range including increasing a rolling load distribution ratio of a front stand of the plurality of rolling stands and reducing a rolling load distribution ratio of a rear stand of the plurality of rolling stands when the crown value as determined from the signal representing the crown value output from the sensor is an allowable value or smaller, which is set to be smaller than an upper limit value of the product quality.

2. The energy-saving-operation recommending system according to claim 1, wherein
the plurality of facilities include a coiler provided downstream of the finishing mill; and
the one or more processors is further configured to:
detect flatness of the material to be rolled from a downstream side of the finishing mill to an upstream side of the coiler, and
recommend an operation condition of increasing the rolling load distribution ratio of the front stand of the plurality of rolling stands and reducing the rolling load distribution ratio of the rear stand of the plurality of rolling stands when an indicator representing variations of flatness is an upper limit value or larger of the product quality.

3. The energy-saving-operation recommending system according to claim 1, wherein the one or more processors is further configured to:
calculate a mechanical property value related to yield stress and tensile strength of the rolled material, and
recommend an operation condition of increasing a finishing mill outlet side target temperature when the mechanical property value is an allowable value or larger, which is set to be larger than a lower limit value of the mechanical property.

4. The energy-saving-operation recommending system according to claim 1, wherein
the one or more processors is further configured to calculate a mechanical property value related to yield stress and tensile strength of the rolled material,
the plurality of facilities include a roughing mill,
the finishing mill is provided downstream of the roughing mill, and the one or more processors is further configured to recommend an operation condition of reducing a target plate thickness of the material to be rolled between the roughing mill and the finishing mill when the mechanical property value is an allowable value or larger, which is set to be larger than a lower limit value of the mechanical property.

5. The energy-saving-operation recommending system according to claim 1, wherein the plurality of facilities include a rolling machine for rolling the material to be rolled, a cooling pump for pumping up cooling water for cooling the material to be rolled, a conveying table for conveying the material to be rolled, and a coiler for winding the material to be rolled.

* * * * *